US009824244B1

United States Patent
Hopkins, III (10) Patent No.: US 9,824,244 B1
(45) Date of Patent: *Nov. 21, 2017

(54) SYSTEMS AND METHODS FOR A WEARABLE USER AUTHENTICATION FACTOR

(71) Applicant: United Services Automobile Association (USAA), San Antonio, TX (US)

(72) Inventor: John C. Hopkins, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 126 days.

This patent is subject to a terminal disclaimer.

(21) Appl. No.: 13/764,542

(22) Filed: Feb. 11, 2013

Related U.S. Application Data (63) Continuation of application No. 12/258,588, filed on Oct. 27, 2008, now Pat. No. 8,371,501.

(51) Int. Cl.
G06K 5/00 (2006.01)
G06Q 20/04 (2012.01)
G06Q 50/12 (2012.01)

(52) U.S. Cl.
CPC ............. G06K 5/00 (2013.01); G06Q 20/045 (2013.01); G06Q 50/12 (2013.01)

(58) Field of Classification Search
CPC ............... H04L 2209/80; H04L 9/0631; H04L 2209/805; H04L 9/32; H04L 9/0643;
(Continued)

(56) References Cited

U.S. PATENT DOCUMENTS 6,115,616 A 9/2000 Halperin et al.
6,232,870 B1 5/2001 Garber et al.
(Continued)

FOREIGN PATENT DOCUMENTS

WO 2008008830 1/2008

OTHER PUBLICATIONS

Halamaka, et al. "The Security Implications of VeriChip Cloning", retrieved from the Internet on Aug. 27, 2008, http://www.rsa.com/rsalabs/staff/bios/ajuels/publications/verichip/Verichip.pdf, 16 pgs.

Primary Examiner — Sonji Johnson
(74) Attorney, Agent, or Firm — Kane Kessler, P.C.; Barry E. Negrin (57) ABSTRACT

A system, method, and computer-usable medium are disclosed for providing multifactor authentication with a wearable user authentication factor. A multi-factor authentication module is implemented to use a plurality of authentication factors, including a unique tag identifier associated with an electronic tag embedded within a wearable article, such as a ring or watch, for the authentication of a user. A user of a wearable user authentication factor approaches a multi-factor terminal, which detects the electronic tag and reads its unique identifier. The user is then requested to provide a predetermined biometric feature, such as a fingerprint, to a biometric reader. The biometric feature is processed to generate a unique biometric identifier. The unique identifier of the electronic tag and the unique biometric identifier is then submitted to a multi-factor authentication module, which compares it to authentication information associated with the user. If the submitted unique identifiers match the user's authentication information, then the user is authenticated.

18 Claims, 6 Drawing Sheets

(58) Field of Classification Search
CPC .............. G08B 25/008; G07C 9/00087; G07C 2209/04; G06Q 50/12; G06Q 10/08; G06Q 20/045; G06K 19/0723
USPC .......................................... 702/19, 200, 20
See application file for complete search history.

(56) References Cited

U.S. PATENT DOCUMENTS

| | | |
|---|---|---|
| 6,294,997 B1 | 9/2001 | Paratore et al. |
| 6,331,145 B1 | 12/2001 | Sity et al. |
| 6,335,686 B1 | 1/2002 | Goff et al. |
| 6,424,262 B2 | 7/2002 | Garber et al. |
| 6,448,886 B2 | 9/2002 | Garber et al. |
| 6,486,780 B2 | 11/2002 | Garber et al. |
| 6,509,217 B1 | 1/2003 | Reddy |
| 6,600,420 B2 | 7/2003 | Goff et al. |
| 6,693,397 B2 | 2/2004 | Handa et al. |
| 6,812,841 B2 | 11/2004 | Heinrich et al. |
| 6,879,876 B2 | 4/2005 | O'Dougherty et al. |
| 6,913,192 B2 | 7/2005 | Washington et al. |
| 6,918,483 B2 | 7/2005 | Washington et al. |
| 6,935,558 B2 | 8/2005 | Washington et al. |
| 6,948,655 B2 | 9/2005 | Washington et al. |
| 6,953,919 B2 | 10/2005 | Clothier |
| 6,956,472 B1 | 10/2005 | Walcott et al. |
| 6,976,634 B2 | 12/2005 | Washington et al. |
| 7,154,375 B2 | 12/2006 | Beenau et al. |
| 7,172,115 B2 | 2/2007 | Lauden |
| 7,204,425 B2 | 4/2007 | Mosher et al. |
| 7,303,120 B2 | 12/2007 | Beenau et al. |
| 7,360,689 B2 | 4/2008 | Beenau et al. |
| 7,500,616 B2 | 3/2009 | Beenau et al. |
| 7,506,818 B2 | 3/2009 | Beenau et al. |
| 7,506,819 B2 | 3/2009 | Beenau et al. |
| 7,690,577 B2 | 4/2010 | Beenau et al. |
| 7,780,091 B2 | 8/2010 | Beenau et al. |
| 2002/0149467 A1* | 10/2002 | Calvesio ............ G07C 9/00087 340/5.52 |
| 2002/0152034 A1* | 10/2002 | Kondo et al. .................. 702/19 |
| 2002/0196963 A1 | 12/2002 | Bardwell |
| 2003/0046228 A1 | 3/2003 | Berney |
| 2003/0173408 A1 | 9/2003 | Mosher et al. |
| 2004/0230488 A1 | 11/2004 | Beenau et al. |
| 2004/0232220 A1 | 11/2004 | Beenau et al. |
| 2004/0232221 A1 | 11/2004 | Beenau et al. |
| 2004/0233037 A1 | 11/2004 | Beenau et al. |
| 2004/0233038 A1 | 11/2004 | Beenau et al. |
| 2004/0233039 A1 | 11/2004 | Beenau et al. |
| 2004/0236699 A1 | 11/2004 | Beenau et al. |
| 2004/0236701 A1 | 11/2004 | Beenau et al. |
| 2004/0238621 A1 | 12/2004 | Beenau et al. |
| 2004/0239480 A1 | 12/2004 | Beenau et al. |
| 2004/0252012 A1 | 12/2004 | Beenau et al. |
| 2004/0257197 A1 | 12/2004 | Beenau et al. |
| 2005/0116024 A1 | 6/2005 | Beenau et al. |
| 2005/0116810 A1 | 6/2005 | Beenau et al. |
| 2005/0168340 A1 | 8/2005 | Mosher et al. |
| 2005/0218215 A1* | 10/2005 | Lauden .............. G07C 9/00087 235/380 |
| 2005/0242921 A1 | 11/2005 | Zimmerman et al. |
| 2005/0278776 A1* | 12/2005 | Kitagawa et al. ................ 726/3 |
| 2006/0090079 A1* | 4/2006 | Oh ..................... G07C 9/00087 713/186 |
| 2006/0255127 A1 | 11/2006 | Woods |
| 2007/0017136 A1 | 1/2007 | Mosher et al. |
| 2007/0035382 A1* | 2/2007 | Lee ..................... G06K 19/0723 340/10.1 |
| 2007/0038565 A1 | 2/2007 | Bartz et al. |
| 2007/0176750 A1* | 8/2007 | Sakai .................... G06Q 10/08 340/10.4 |
| 2007/0194882 A1* | 8/2007 | Yokota .................... G06F 21/34 340/5.61 |
| 2007/0197261 A1 | 8/2007 | Humbel |
| 2007/0242424 A1 | 10/2007 | Lieu et al. |
| 2007/0252001 A1 | 11/2007 | Kail et al. |
| 2007/0271113 A1 | 11/2007 | Nelson et al. |
| 2007/0289002 A1* | 12/2007 | van der Horst ......... G06F 21/42 726/9 |
| 2007/0296544 A1 | 12/2007 | Beenau et al. |
| 2007/0299782 A1 | 12/2007 | Beenau et al. |
| 2007/0299783 A1 | 12/2007 | Beenau et al. |
| 2007/0299868 A1* | 12/2007 | Huomo ................ G06Q 20/045 |
| 2008/0008359 A1 | 1/2008 | Beenau et al. |
| 2008/0010161 A1 | 1/2008 | Beenau et al. |
| 2008/0015941 A1 | 1/2008 | Beenau et al. |
| 2008/0016002 A1 | 1/2008 | Beenau et al. |
| 2008/0017704 A1 | 1/2008 | Vandeburg et al. |
| 2008/0046273 A1 | 2/2008 | Beenau et al. |
| 2008/0140580 A1 | 6/2008 | Beenau et al. |
| 2008/0238627 A1 | 10/2008 | Oldham et al. |
| 2009/0206992 A1 | 8/2009 | Giobbi et al. |
| 2010/0030633 A1 | 2/2010 | Beenau et al. |
| 2010/0030693 A1 | 2/2010 | Beenau et al. |
| 2010/0134296 A1 | 6/2010 | Hwang |
| 2010/0271180 A1* | 10/2010 | Oberle ................... G06Q 50/12 340/10.1 |

* cited by examiner

SYSTEMS AND METHODS FOR A WEARABLE USER AUTHENTICATION FACTOR

CROSS REFERENCE TO RELATED APPLICATIONS

The present application is a Continuation Application of U.S. patent application Ser. No. 12/258,588, filed Oct. 27, 2008, now U.S. Pat. No. 8,371,501 and is related by subject matter to the subject matter disclosed in the following commonly assigned application, the entirety of which is hereby incorporated by reference herein: U.S. patent application Ser. No. 12/258,608, filed Oct. 27, 2008.

BACKGROUND

Field of the Disclosure

Embodiments of the disclosure relate in general to the field of computers and similar technologies, and in particular to software utilized in this field. Still more particularly, it provides a system, method, and computer-usable medium for providing multi-factor authentication of a user of a wearable user authentication factor.

Description of the Related Art

Today, the threat of identity theft and fraud is pervasive and its prevention has become a growing concern. This threat is not just limited to the financial industry it can adversely affect all aspects of commercial and consumer activities. Simply put, identity theft is where a first party poses as a second party by using information associated with a second party to commit a fraudulent act with a third party. The third party believes that the first party is who they claim to be because they are using information that generally would only be known by the second party. A common solution to preventing identity theft is the use of authentication credentials that prove the identity of the user.

There are numerous approaches to the implementation of authentication credentials. Some of these approaches are simple, yet vulnerable to compromise. Others, such as a public key infrastructure (PKI), which uses various combinations of public and private cryptographic keys in a network environment, are complex, costly to implement, and difficult to maintain. Furthermore, as identity thieves and the technologies they employ become more sophisticated, such systems become more prone to compromise as well. In recent years, there has been a growing awareness that any single means of authentication is insufficient to prevent identity theft and fraud. Accordingly, there has been a movement to the adoption of multi-factor authentication, which combines multiple methods, or factors, of authenticating a party. Authentication factors used in multi-factor authentication are typically something a user knows, such as a personal identification number (PIN), something intrinsic to the user, such as a biometric indicator, and something the user possesses, such as a physical article comprising a unique identifier.

However, current multi-factor authentication approaches have their own attendant issues, one of which is ensuring that the physical factor, such as a payment card, a smart card, a USB dangle, or a one-time password-generating token device, is always available for use. Due to their unattached nature and small form factors, these devices will often be left behind, lost, or worse, stolen. Furthermore, many of these devices are dedicated to a single authentication action. As a result, the user is required to not only carry multiple articles, one for each authentication action they may anticipate, but remember which article is used for which purpose. For example, the user may carry a smartcard for access into a restricted physical facility. Once inside the facility, a USB dongle may be required to access a secured information processing system, which once accessed, requires a one-time password-generating token device for the user to then gain access to a restricted information repository. If the user decides to leave the facility for lunch, then an ATM card may be required to get cash from an ATM machine. After leaving the facility for the day, the user may wish to make a purchase with one of several payment cards they may be carrying. Accordingly, making sure that the right authentication article is available at the right time, at the right place, can prove challenging.

BRIEF SUMMARY

A system, method, and computer-usable medium are disclosed for providing multifactor authentication of a user of a wearable user authentication factor. In various embodiments, an electronic tag comprising a unique tag identifier is embedded within a wearable article, such as a ring or watch, to provide a wearable user authentication factor to a multi-factor authentication module for the authentication of a user. In one embodiment, the electronic tag comprises a radio frequency identifier (RFID) tag. As used herein, an authentication factor refers to an item of information and any associated process used to authenticate a person's identity. As likewise used herein, multi-factor authentication refers to any authentication process that uses two or more different authentication factors to authenticate a user. Authentication factors used in multi-factor authentication are typically something a user knows, such as a personal identification number (PIN), something intrinsic to the user, such as a biometric indicator, and something the user possesses, such as an electronic tag comprising a unique tag identifier.

In these and other embodiments, a user of a wearable user authentication factor approaches a multi-factor terminal for authentication. The multi-factor authentication terminal uses an electronic tag reader, such as an RFID tag reader, to determine whether an electronic tag embedded within an article worn by the user is detected. Once the electronic tag is detected, the electronic tag reader reads its associated unique tag identifier and stores it in temporary memory. In one embodiment, the user is requested to provide a predetermined biometric feature, such as a fingerprint, as a biometric authentication factor. The user provides the requested biometric feature to a biometric reader coupled to the multi-factor authentication terminal. The biometric feature is then processed to generate a unique biometric identifier, which is then stored in temporary memory. In another embodiment, the user is requested to provide a personal identification number (PIN) to be authenticated. The user provides the requested PIN information using a keypad coupled to the multi-factor authentication terminal. Once the PIN information is entered, it is stored in temporary memory.

In various embodiments, the authentication information stored in temporary memory is submitted by the multi-factor authentication terminal to a multi-factor authentication module. The multi-factor authentication module receives the submitted authentication information and then compares it to authentication information associated with the user. In one embodiment, the multi-factor authentication module is operable to access a database comprising an index cross-referencing the unique tag identifier to the user's authentication information. In various embodiments, the multi-factor authentication module is operable to access a database comprising an index cross-referencing the biometric identifier or the PIN to the user's authentication information. If the submitted authentication information matches the user's authentication information, then the user is authenticated.

BRIEF DESCRIPTION OF THE DRAWINGS

Selected embodiments of the disclosure may be understood, and its numerous objects and features obtained, when the following detailed description is considered in conjunction with the following drawings, in which.

DETAILED DESCRIPTION

A method, system and computer-usable medium are disclosed for providing multifactor authentication of a user of a wearable user authentication factor. As will be appreciated by one skilled in the art, the disclosure may be embodied as a method, system, or computer program product. Accordingly, various embodiments may be implemented entirely in hardware, entirely in software (including firmware, resident software, micro-code, etc.) or in an embodiment combining software and hardware. These various embodiments may all generally be referred to herein as a "circuit," "module," or "system."

For purposes of this disclosure, an information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing system may be a personal computer, a personal digital assistant (PDA), a wirelessly-enabled mobile telephone, a server, a network storage device, or any other suitable device and may vary in size, shape, performance, functionality, and price. The information processing system may include random access memory (RAM), one or more processing resources such as a central processing unit (CPU) or hardware or software control logic, read only memory (ROM), and/or other types of nonvolatile memory. Additional components of the information processing system may include one or more disk drives, one or more network ports for communicating with external devices, as well as various input and output (I/O) devices, such as a keyboard, a mouse, and a video display. The information processing system may also include one or more buses operable to transmit communications between the various hardware components.

Additionally, various embodiments may take the form of a computer program product on a computer-usable storage medium having computer-usable program code embodied in the medium. Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. A non-exhaustive list of more specific examples of the computer-readable medium would include the following: an electrical connection having one or more wires, an optical fiber, a transmission media such as those supporting the Internet or an intranet, a random access memory (RAM), a read-only memory (ROM), an erasable programmable read-only memory (EPROM or Flash memory), a magnetic storage device, a portable computer diskette, a hard disk, an optical storage device, a portable compact disc read-only memory (CD-ROM), or a digital versatile disk (DVD). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, wireless, radio frequency (RF), etc.

Computer program code for carrying out operations in various embodiments may be written in an object oriented programming language such as Java, Smalltalk, C++ or the like. However, the computer program code for carrying out operations in various embodiments may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a wireless local area network (WLAN), a wireless wide area network (WW AN), a or personal area network (PAN). In addition, the connection may be made to an external computer (for example, through the Internet using an Internet Service Provider) using any combination of telecommunication technologies and protocols operable to establish a network connection for the exchange of information.

Embodiments of the disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer, information processing system, or other programmable data processing apparatus, to function in a particular manner such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
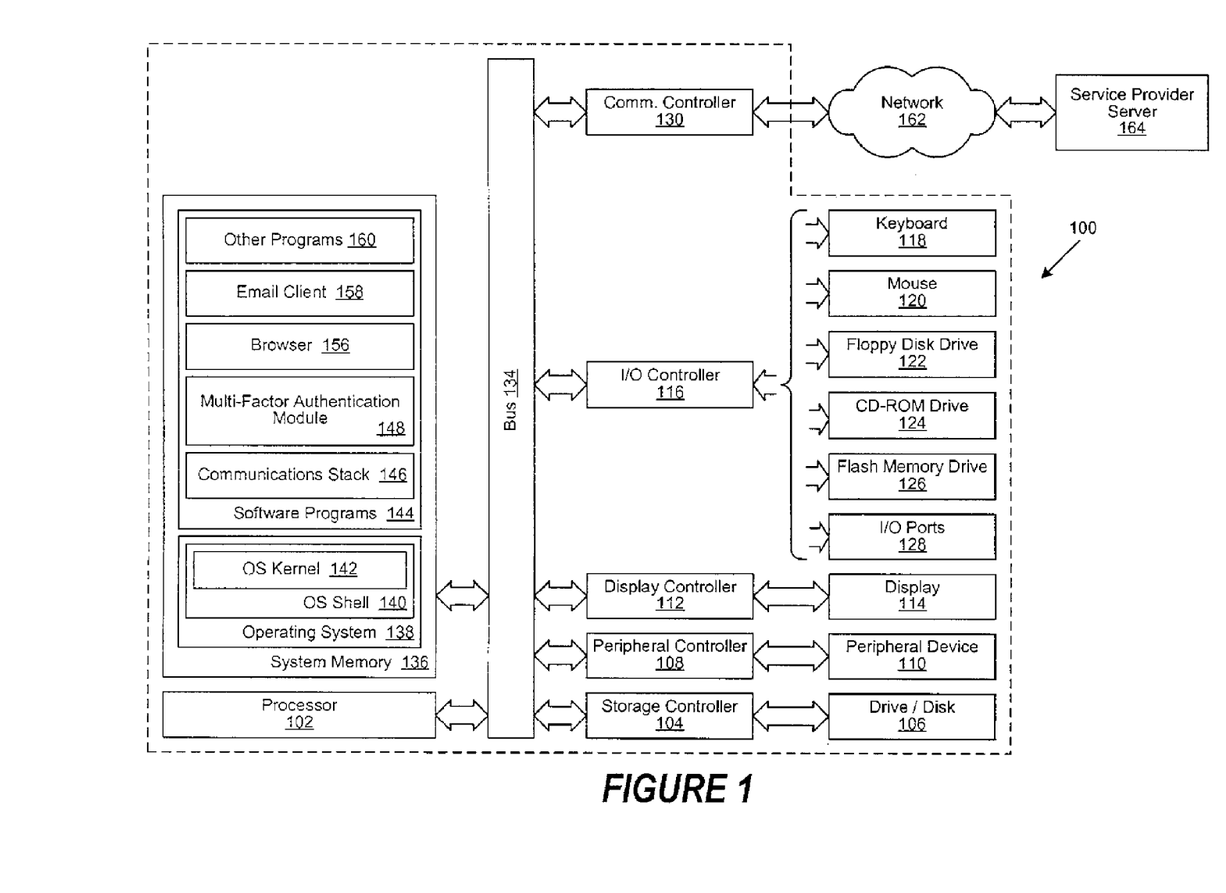
FIG. 1 depicts an exemplary client information processing system (IPS) in which embodiments of the disclosure may be implemented.

FIG. 1 is a generalized block diagram of an exemplary client information processing system (IPS) 100 in which various embodiments may be utilized. Client IPS 100 includes a processor unit 102 that is coupled to one or more buses 134. A display controller 112, which controls a display 114, is also coupled to or more buses 134, along with peripheral controller 108, which controls one or more peripheral devices 110. An input/output (I/O) controller 116 affords communication with various I/O devices, including a keyboard 118, a mouse 120, a floppy disk drive 122, a Compact Disk-Read Only Memory (CD-ROM) drive 124, a flash drive memory 126, and one or more I/O ports 128. The format of the ports connected to the I/O controller 116 may be any known to those skilled in the art of computer architecture, including but not limited to Universal Serial Bus (USB) ports.

Client IPS 100 is able to communicate with a service provider server 164 via a network 162 using a communications controller 130, which is coupled to one or more buses 134. Network 162 may be the public switched telephone network (PSTN), an external network such as the public Internet, an internal network such as an Ethernet-based local area network (LAN), a Virtual Private Network (VPN) such as a corporate intranet, or any combination of telecommunication technologies and protocols operable to establish a network connection for the exchange of information. Using network 162, client IPS 100 is able to access service provider server 164.

A storage controller 104 is also coupled to one or more buses 134. Storage controller 104 interfaces with storage disk or drive 106, which may comprise a magnetic storage device such as a hard disk or tape drive. In various embodiments, storage disk or drive 106 populates a system memory 136, which is also coupled to one or more buses 134. Data that populates system memory 136 includes the client IPS 100 operating system (OS) 138 and software programs 144.

OS 138 includes a shell 140 for providing transparent user access to resources such as software programs 144. Generally, shell 140 is a program that provides an interpreter and an interface between the user and the operating system.

More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted commands) to the appropriate lower levels of the operating system (e.g., a kernel 142) for processing. While shell 140 generally is a text-based, line-oriented user interface, various embodiments may also support other user interface modes, such as graphical, voice, gestural, etc. As depicted, OS 138 also includes kernel 142, which includes lower levels of functionality for OS 138, including services used by other parts of OS 138 and software programs 144, including memory management, process and task management, disk management, and mouse and keyboard management.

Software programs 144 may include a communications stack 146, browser 156, email client 158, and other programs 160. The communications stack 146 is operable to implement any communication protocol enabling various embodiments of the disclosure. Browser 156 includes program modules and instructions enabling a World Wide Web (WWW) client (i.e., IPS 100) to send and receive network messages to the Internet using HyperText Transfer Protocol (HTTP) messaging, thus enabling communication with service provider server 164. Software programs 144 also include a multi-factor authentication module 148. The multi-factor authentication module 148 includes computer executable instructions for implementing the processes described in FIGS. 2-5 described hereinbelow. In one embodiment, client IPS 100 is able to download the computer executable instructions of the multi-factor authentication module 148 from a service provider server 164 located at a remote location. In another embodiment, the computer executable instructions of the multi-factor authentication module 148 are provided by a service provider as a service, such as a Web service implemented on a Service-Oriented Architecture (SOA), to the client IPS 100 on an on-demand basis.

The hardware elements depicted in client IPS 100 are not intended to be exhaustive, but rather are representative to highlight components used by the disclosure. For instance, client IPS 100 may include alternate memory storage devices such as magnetic cassettes, Digital Versatile Disks (DVDs), Bernoulli cartridges, and the like. These and other variations are intended to be within the spirit and scope of the disclosure.

Figure 2:
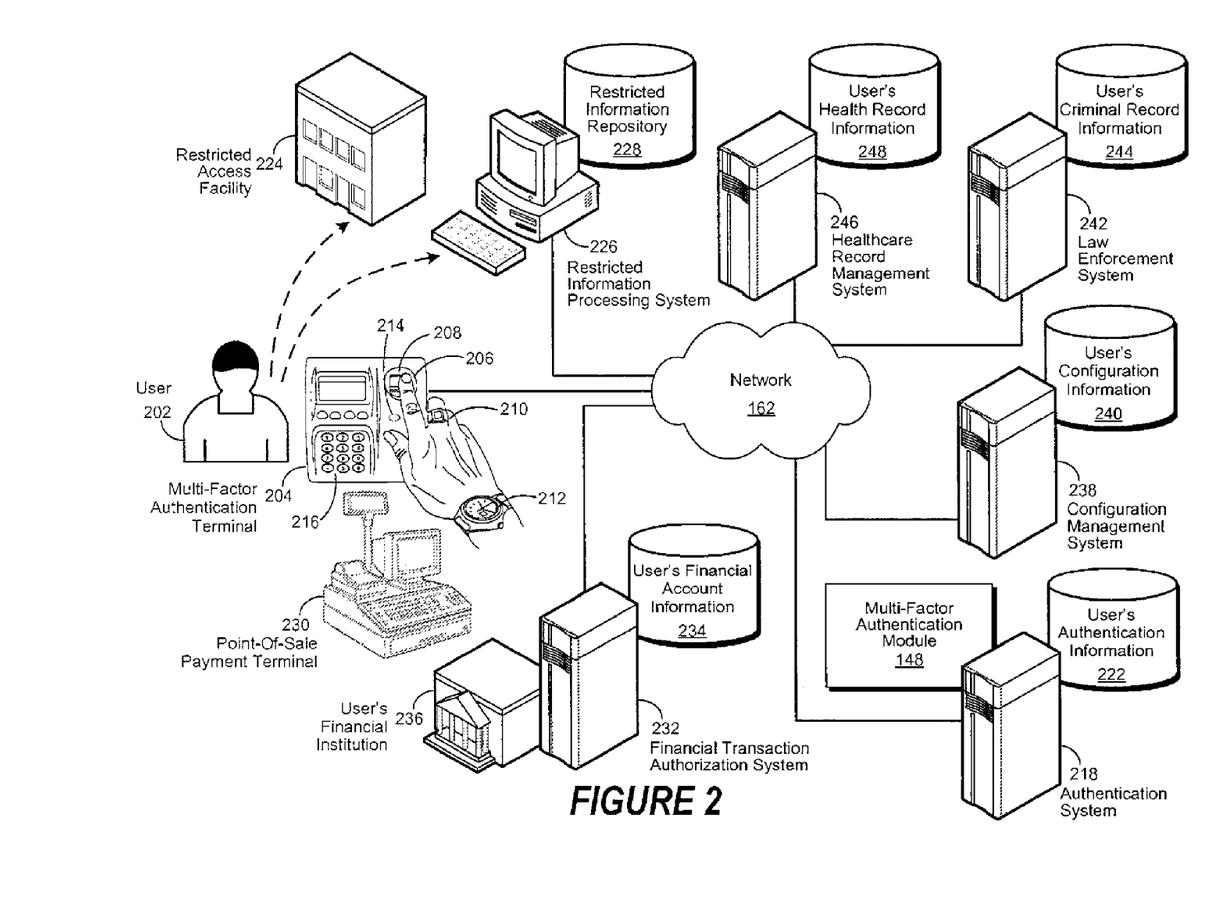
FIG. 2 is a simplified block diagram of the operation of a wearable user authentication factor as implemented with a multi-factor authentication module in accordance with an embodiment of the disclosure.

FIG. 2 is a simplified block diagram of the operation of a wearable user authentication factor as implemented with a multi-factor authentication module in accordance with an embodiment of the disclosure. In various embodiments, an electronic tag comprising a unique tag identifier is embedded within a wearable article, such as a ring 210 or watch 212, to provide a wearable user authentication factor to a multi-factor authentication module 148 for the authentication of a user 202. In one embodiment, the electronic tag comprises a radio frequency identifier (RFID) tag familiar to those of skill in the art. As used herein, an authentication factor refers to an item of information and any associated process used to authenticate or verify a person's identity. As likewise used herein, multi-factor authentication refers to any authentication process that uses two or more different authentication factors to authenticate the user 202. Skilled practitioners of the art will be aware that authentication factors used in multifactor authentication typically refer to something associated with a user 202. As an example, the authentication factor may be something the user 202 knows, such as a personal identification number (PIN). As another example, the authentication factor may be something intrinsic to the user 202, such as a biometric indicator. Examples of a biometric indicator may be a fingerprint 206 or a retinal pattern of the user 202. The authentication factor may also be something the user 202 possesses, such as a token or an electronic tag comprising a unique tag identifier.

In these and other embodiments, a user 202 of a wearable user authentication factor approaches a multi-factor terminal 204 for authentication. The multi-factor authentication terminal uses an electronic tag reader 214, such as an RFID tag reader, to determine whether an electronic tag embedded within a wearable article 210, 212 is detected. Once the electronic tag is detected, the electronic tag reader 214 reads its associated unique tag identifier.

In one embodiment, the electronic tag reader 214 recognizes multiple unique tag identifiers. In this embodiment, a list is generated of the authentication action associated with individual tag identifiers and the resulting list is then presented to the user 202 within a display of the multi-factor authentication terminal 204. In one embodiment, the list comprises a unique tag identifier associated with authenticating the user 202 for access to a restricted physical facility 224. In another embodiment, the list comprises a unique tag identifier for authenticating the user 202 for access to a restricted information processing system 226. In yet another embodiment, the list comprises a unique tag identifier for authenticating the user 202 for access to a restricted information repository 228. In various embodiments, the list comprises a unique tag identifier for authenticating the user 202 for the provision of information associated with the user 202. In one embodiment, the associated information comprises the user's healthcare information 248, which is managed by a healthcare record management system 246. In another embodiment, the associated information comprises the user's criminal record 244, managed by a law enforcement system 242. In yet another embodiment, the associated information comprises information processing system (IPS) configuration 240, managed by a configuration management system 238. In one embodiment, the list comprises a unique tag identifier for authenticating the user for the initiation of a financial transaction at a point-of-sale payment terminal 230. In this embodiment, the one or more unique identifiers of an electronic tag embedded within a wearable article, such as ring 210 or watch 212, is associated with the user's financial information 234, which is managed by a financial transaction authorization system 232 operated by the user's financial institution 236. It will be apparent to those of skill in the art that it would be possible to have many different unique tag identifiers associated with a single electronic tag, yet have individual unique tag identifiers associated with a different authentication action.

In one embodiment, the user 202 is requested to provide a predetermined biometric feature, such as a fingerprint 206, as a biometric authentication factor. The user provides the requested biometric feature (e.g., fingerprint 206) to a biometric reader 208 operably coupled to the multi-factor authentication terminal 204. The biometric feature (e.g., 206) is then processed to generate a unique biometric identifier, which once generated, is stored in temporary memory. In another embodiment, the user 202 is requested to provide a personal identification number (PIN) to be authenticated. The user 202 provides the requested PIN information using the keypad 216 operably coupled to the multi-factor authentication terminal 204. Once the PIN information is entered, it is stored in temporary memory.

In various embodiments, the authentication information stored in temporary memory is submitted by the multi-factor authentication terminal 204 to a multi-factor authentication module 148 via a connection to network 162 to an authentication system 218. In various embodiments, the authentication system 218 comprises a multi-factor authentication module 148. The multi-factor authentication module 148 receives the submitted authentication information and then compares it to authentication information 222 that is associated with the user 202. In one embodiment, the multi-factor authentication module 148 is operable to access a database comprising an index cross-referencing the unique tag identifier of an electronic tag 410, 412 to the authentication information 222 associated with the user 202. In another embodiment, the multi-factor authentication module 148 is operable to access a database comprising an index cross-referencing the unique biometric identifier or PIN information to the authentication information 222 associated with the user 202. If the submitted authentication information matches the authentication information 222 associated with the user, then the user 202 is authenticated.

Figure 3:
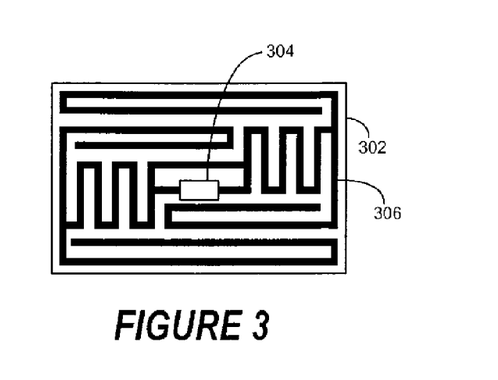
FIG. 3 is a simplified illustration of a radio frequency identifier (RFID) as implemented in accordance with an embodiment of the disclosure for providing a wearable user authentication factor.

FIG. 3 is a simplified illustration of a radio frequency identifier (RFID) as implemented in accordance with an embodiment of the disclosure for providing a wearable user authentication factor. In this embodiment, the RFID tag 302 comprises an integrated circuit 304 (e.g., a microchip) and an antenna 306. In various embodiments, the RFID tag 302 comprises a radio frequency identification (RFID) tag that can be read by an RFID tag reader. In these and other embodiments, the RFID tag may be passive, active, or semi-passive. Passive RFID tags have no internal power supply. Instead, an electrical current induced in the RFID's antenna provides power to transmit a response. Passive RFID tags typically have a practical read distance of approximately four inches. Currently, micro RFID tags are available that measure as small as 0.05×0.05 mm. It will be apparent to those of skill in the art that such micro RFID tags are suitable for embedding in wearable articles, such as jewelry.

In contrast, an active RFID tag has its own power source and may transmit at higher power levels than passive RFID tags. Currently, active RFID tags implement batteries that have a life expectancy of up to ten years. Semi-passive RFID tags also have their own power source, but the battery only powers the RFID tag's microchip and is not used for broadcasting of a signal. As with passive RFID tags, the power to broadcast a signal is received from the RF energy emitted by an RFID tag reader. It will be equally apparent to those of skill in the art that such active and semi-passive are likewise suitable for embedding in wearable articles, such as jewelry.

Figure 4:
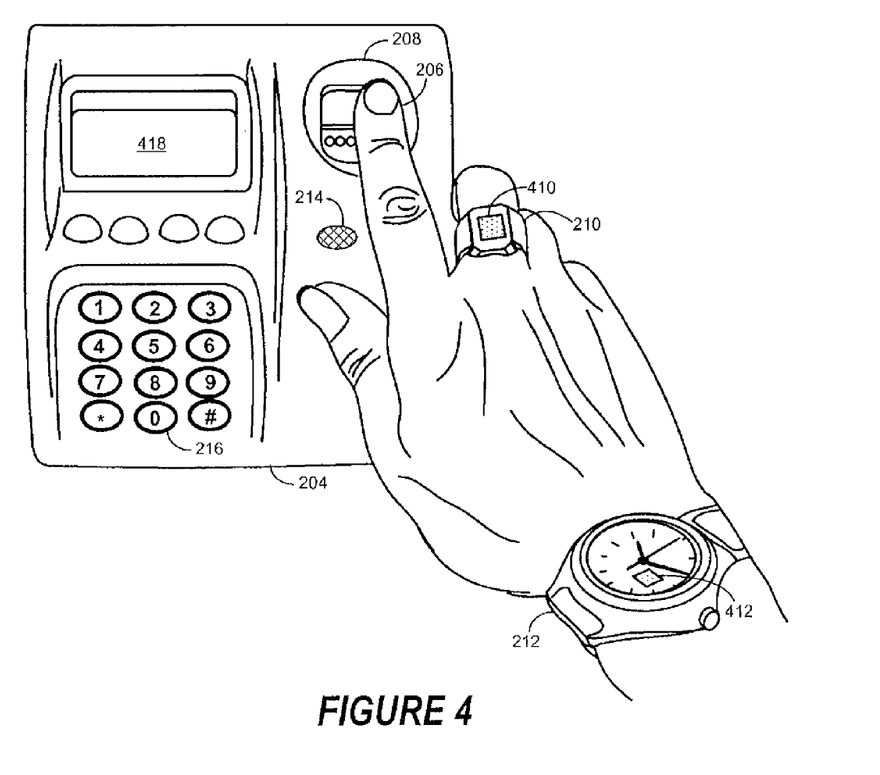
FIG. 4 is a simplified illustration of a radio frequency identifier (RFID) as implemented in a wearable user authentication factor in accordance with an embodiment of the disclosure.

FIG. 4 is a simplified illustration of a radio frequency identifier (RFID) as implemented in a wearable user authentication factor in accordance with an embodiment of the disclosure. In various embodiments, an electronic tag 410, 412 is respectively embedded in a wearable article, such as a ring 210 or a watch 212, proximate to a biometric indicator, such as the fingerprint 206 of a user of the wearable article 210 or 212. In these and other embodiments, a user of a wearable user authentication factor approaches a multi-factor terminal 204 for authentication. The multi-factor authentication terminal uses an electronic tag reader 214, such as an RFID tag reader, to determine whether an electronic tag 410, 412, respectively embedded within a wearable article 210, 212 is detected. In one embodiment, the electronic tag 410,412 comprises read-only memory, which further comprises multiple unique tag identifiers and is not operable to rewrite the unique tag identifier. In another embodiment, the electronic tag 410, 412 comprises rewritable memory, which further comprises multiple unique tag identifiers and is operable to rewrite individual unique tag identifiers. In yet another embodiment, a plurality of electronic tags 410, 412 are respectively embedded within the wearable article 210, 212.

Once the electronic tag reader 214 reads the individual or multiple unique tag identifiers associated with the electronic tag 410,412, an authentication action associated with individual tag identifiers is presented to the user on the display 418 of the multi-factor terminal 204. In one embodiment, the user 202 is requested to provide a predetermined biometric feature, such as a fingerprint 206 as a biometric authentication factor. The user then provides the requested biometric feature (e.g., fingerprint 206) to a biometric reader 208 operably coupled to the multi-factor authentication terminal 204. The biometric feature (e.g., 206) is then processed to generate a unique biometric identifier. In one embodiment, the unique biometric identifier is generated by the biometric reader 208. In another embodiment, the unique biometric identifier is generated by the multi-factor authentication terminal 204. In yet another embodiment, the unique biometric identifier is generated by a multi-factor authentication module. It will be appreciated that there are many approaches known to skilled practitioners of the art for generating such unique biometric identifiers and all such known approaches are incorporated herein by reference. Once generated, the unique biometric identifier is stored in temporary memory.

In one embodiment, the user is requested to provide a personal identification number (PIN) to be authenticated. The user then provides the requested PIN information using the keypad 216 operably coupled to the multi-factor authentication terminal 204. Once the PIN information is entered, it is stored in temporary memory. In various embodiments, the authentication information stored in temporary memory is submitted to a multi-factor authentication module. The multi-factor authentication module receives the submitted authentication information and then compares it to authentication information that is associated with the user. In one embodiment, the multi-factor authentication module is operable to access a database comprising an index cross-referencing the unique tag identifier of an electronic tag 410, 412 to the authentication information associated with the user. In another embodiment, the multi-factor authentication module is operable to access a database comprising an index cross-referencing the unique biometric identifier or the PIN information to the authentication information associated with the user. If the submitted authentication information matches the authentication information associated with the user, then the user is authenticated for the selected authentication action.

Figure 5A:
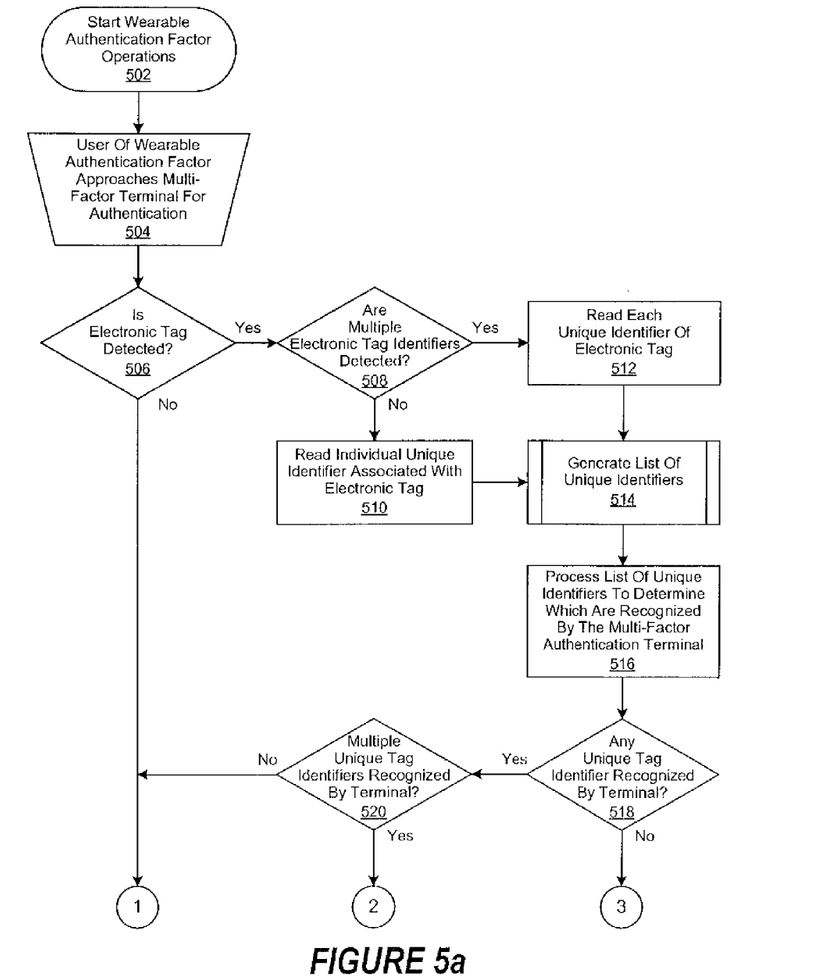
FIGS. 5a-c are a generalized flowchart of the operation of a wearable user authentication factor as implemented with a multi-factor authentication module in accordance with an embodiment of the disclosure.
Figure 5B:
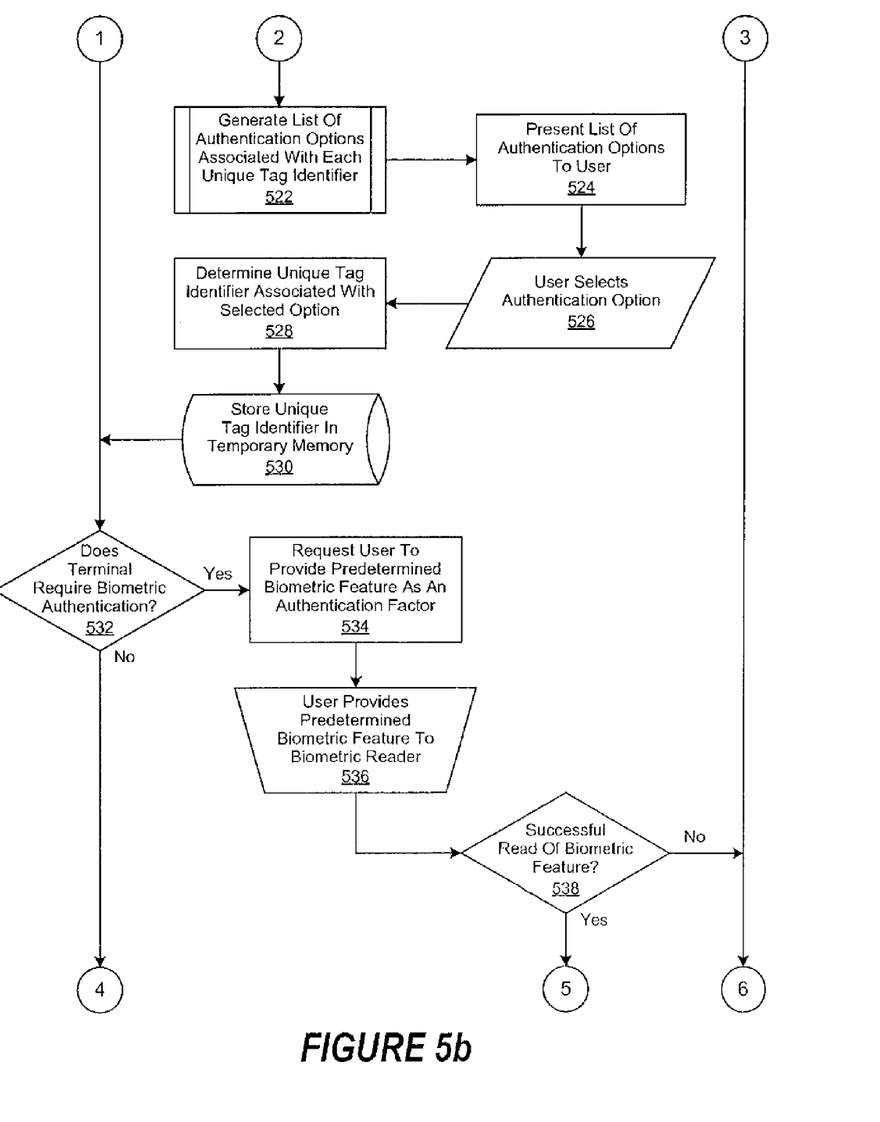
Figure 5C:
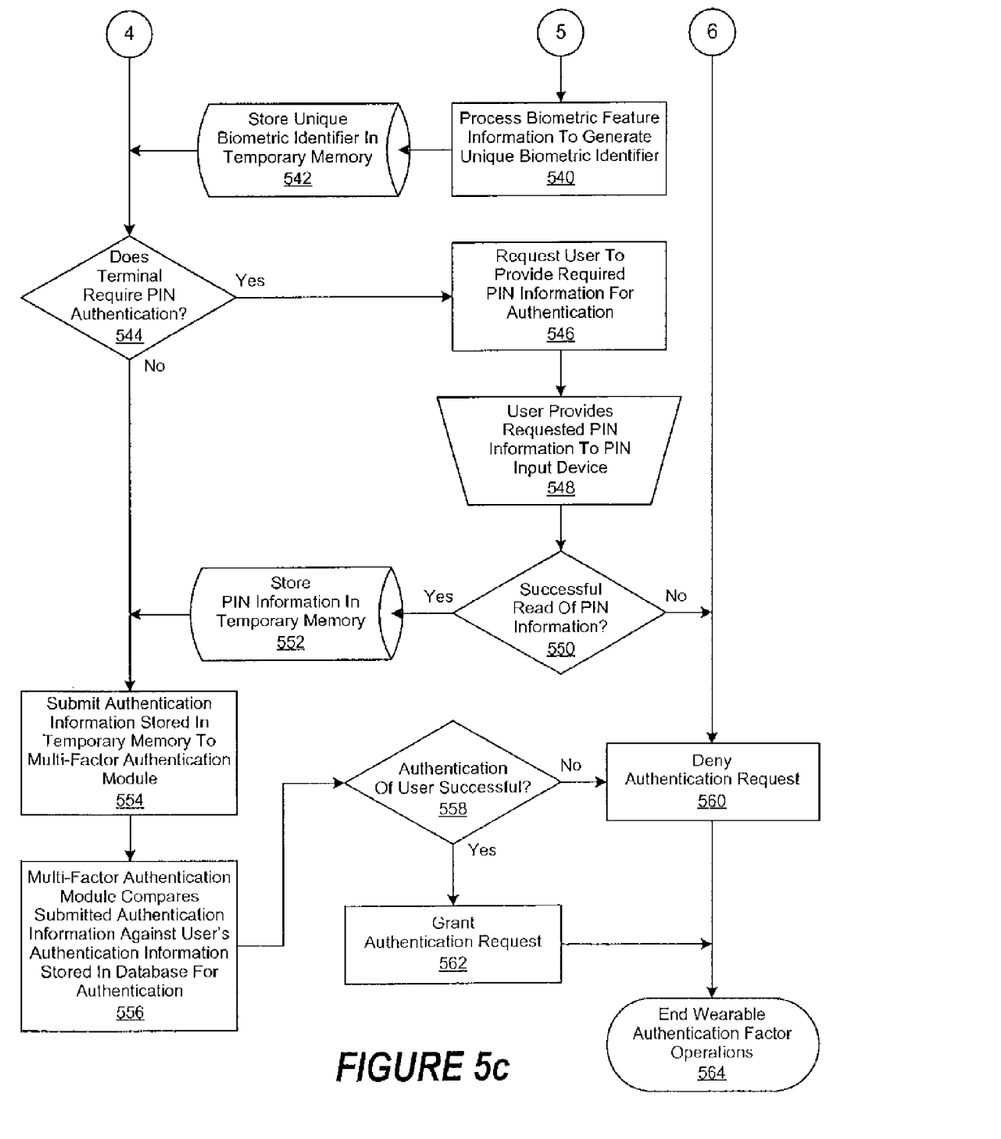

FIGS. 5*a-c* are a generalized flowchart of the operation of a wearable user authentication factor as implemented with a multi-factor authentication module in accordance with an embodiment of the disclosure. In various embodiments, a multi-factor authentication module is implemented to use a plurality of authentication factors, including a unique tag identifier associated with an electronic tag embedded within a wearable article, such as a ring, watch, or bracelet, for the authentication of a user. In one embodiment, the electronic tag comprises a radio frequency identifier (RFID) tag familiar to those of skill in the art. As used herein, an authentication factor refers to an item of information and any associated process used to authenticate or verify a person's identity. As likewise used herein, multi-factor authentication refers to any authentication process that uses two or more different authentication factors to authenticate the user. Skilled practitioners of the art will be aware that authentication factors used in multi-factor authentication typically refer to something associated with a user. As an example, the authentication factor may be something the user knows, such as a personal identification number (PIN). As another example, the authentication factor may be something intrinsic to the user, such as a biometric indicator. Examples of a biometric indicator may be a fingerprint or a retinal pattern of the user. The authentication factor may also be something the user possesses, such as a token or an electronic tag comprising a unique tag identifier. It will be obvious to those of skill in the art that many such authentication factors are possible and the foregoing are offered only as examples and are not intended to limit the spirit, intent, or scope of the present disclosure.

In this embodiment, wearable user authentication factor operations are begun in block 502, followed by a user of a wearable user authentication factor approaching a multi-factor terminal for authentication in block 504. In block 506, a determination is made whether an electronic tag embedded within the wearable user authentication factor is detected by the multifactor authentication terminal. If so, then a determination is made in block 508 whether multiple unique tag identifiers associated with the electronic tag are detected. If not, then the unique tag identifier of the electronic tag is read by the multi-factor authentication terminal in block 510. In one embodiment, the electronic tag comprises read-only memory, which further comprises the unique tag identifier and is not operable to rewrite the unique tag identifier. In another embodiment, the electronic tag comprises rewritable memory, which further comprises the unique tag identifier and is operable to rewrite the unique tag identifier.

However, if it is determined in block 508 that multiple unique tag identifiers are detected, then individual unique identifiers associated with the electronic tag are read in block 512. In one embodiment, the electronic tag comprises read-only memory, which further comprises multiple unique tag identifiers and is not operable to rewrite the unique tag identifier. In another embodiment, the electronic tag comprises rewritable memory, which further comprises multiple unique tag identifiers and is operable to rewrite individual unique tag identifiers. Once the individual unique tag identifier has been read in block 510, or individual unique tag identifiers associated with the electronic tag is read in block 512, a list of unique identifiers is generated in block 514. The list of unique tag identifiers is then processed in block 516 to determine which, if any, of the unique tag identifiers are recognized by the multi-authentication terminal. A determination is then made in block 518 whether any of the unique tag identifiers are recognized by the multi-authentication terminal. If none of the unique tag identifiers are recognized, then the authentication request is denied in block 560 and wearable user authentication factor operations are ended in block 564.

However, if it is determined in block 518 that one or more of the unique tag identifiers is recognized by the multi-factor authentication terminal, then a determination is made in block 520 whether multiple unique tag identifiers are recognized. If so, then a list is generated in block 522 of the authentication action associated with individual tag identifiers and the resulting list is then presented to the user in block 524. As used herein, an authentication action refers to a series of process steps associated with the authentication of a user. The series of process steps may be simple, such as simply authenticating the user, or complex, such as initiating a series of other process steps, such as the steps involved in a financial transaction. In one embodiment, the list comprises a unique tag identifier associated with authenticating the user for access to a physical facility. In another embodiment, the list comprises a unique tag identifier for authenticating the user for access to a restricted information processing system. In yet another embodiment, the list comprises a unique tag identifier for authenticating the user for access to a restricted information repository. In one embodiment, the list comprises a unique tag identifier for authenticating the user for the provision of information associated with the user. In various embodiments, the associated information comprises medical information, law enforcement information, or information processing system information associated with the user. In another embodiment, the list comprises a unique tag identifier for authenticating the user for the initiation of a financial transaction. It will be apparent to those of skill in the art that it would be possible to have many different unique tag identifiers associated with a single electronic tag, with each in turn associated with a different authentication action.

The user then selects an authentication action in block 526, followed by the determination in block 528 of the unique tag identifier associated with the selected authentication action. Once identified, the unique tag identifier is then stored in temporary memory in block 530. Once the unique tag identifier has been stored in temporary memory, or if it is determined in block 506 that no electronic tag was detected, then a determination is made in block 532 whether the multi-factor authentication terminal requires biometric authentication of the user. If so, then the user is requested in block 534 to provide a predetermined biometric feature as described in greater detail herein as a biometric authentication factor. The user then provides the requested biometric feature in block 536 to a biometric reader operably coupled to the multifactor authentication terminal. A determination is then made in block 538 whether the biometric feature was successfully read. If not, then the authentication request is denied in block 560 and wearable user authentication factor operations are ended in block 564. Otherwise, the biometric feature is processed in block 540 to generate a unique biometric identifier. In one embodiment, the unique biometric identifier is generated by the biometric reader. In another embodiment, the unique biometric identifier is generated by the multi-factor authentication terminal. In yet another embodiment, the unique biometric identifier is generated by a multi-factor authentication module. It will be appreciated that there are many approaches known to skilled practitioners of the art for generating such unique biometric identifiers and all such known approaches are incorporated herein by reference. Then, in block 542, the unique biometric identifier is stored in temporary memory.

Once the unique biometric identifier has been stored in temporary memory, or if it was determined in block 532 that biometric authentication of the user was not required, then a determination is made in block 544 whether the multi-factor authentication terminal requires a receipt of a personal identification number (PIN) for the user to be authenticated. If so, then the user is requested in block 546 to provide PIN information as described in greater detail herein as an authentication factor. The user then provides the requested PIN information in block 548 to a PIN reader operably coupled to the multi-factor authentication terminal. A determination is then made in block 550 whether the biometric feature was successfully read. If not, then the authentication request is denied in block 560 and wearable user authentication factor operations are ended in block 564. Otherwise, the PIN information is stored in temporary memory in block 552.

Once the PIN information is stored in temporary memory, or if it was determined in block 532 that biometric authentication of the user was not required, then the authentication information stored in temporary memory is submitted in block 554 to the multi-factor authentication module. In block 556, the multi-factor authentication module receives the submitted authentication information and then compares it to authentication information that is associated with the user. In one embodiment, the multi-factor authentication module is operable to access a database comprising an index cross-referencing the unique tag identifier of an electronic tag to the authentication information associated with the user. In another embodiment, the multi-factor authentication module is operable to access a database comprising an index cross-referencing the unique biometric identifier or the PIN information to authentication information associated with the user. A determination is then made in block 558 by the multifactor authentication module whether the submitted authentication information matches the authentication associated with the user. If not, then the user is not authenticated and the authentication request is denied in block 560 and wearable user authentication factor operations are ended in block 564. However, if so, then the user is authenticated and the authentication request is granted in block 562 and wearable user authentication factor operations are ended in block 564.

The flowchart and block diagrams in the figures illustrate the architecture, functionality, and operation of possible implementations of systems, methods and computer program products according to various embodiments of the disclosure. Accordingly, each block in the flowchart or block diagrams may represent a module, segment, or portion of code, which comprises one or more executable instructions for implementing the specified logical function(s). In certain alternative implementations, the functions performed in a particular block may occur in an order that is different than what is noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "embodiment" can be used to describe any aspect, feature, process or step, any combination thereof, and/or any portion thereof, of the disclosure and should not be interpreted as limiting the scope of the application or claims.

While the disclosure has been described by reference to particular embodiments, such references do not imply a limitation and no such limitation is to be inferred. As such, the disclosure includes any and all embodiments having equivalent elements, modifications, omissions, combinations (e.g., of aspects across various embodiments), adaptations, alterations, and equivalents in form and function. As will be further appreciated by those skilled in the pertinent arts, the disclosure has a number of aspects and embodiments, and various embodiments may include overlapping features.

For example, the above-discussed embodiments may include software modules that include script, batch, or other executable files for the performance of certain tasks. These software modules may be stored on a machine-readable or computer-readable storage medium such as a disk drive. Storage devices used for storing software modules in accordance with various embodiments may include magnetic floppy disks, hard disks, or optical discs such as CD-ROMs or DVDs. A storage device used for storing firmware or hardware modules in accordance with an embodiment may also include a semiconductor-based memory, which may be permanently, removably or remotely coupled to a microprocessor/memory system. Thus, the software modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module. In addition, each of the referenced components in this embodiment may be comprised of a plurality of components, each interacting with the other in a distributed environment. Furthermore, other embodiments may expand on the referenced embodiment to extend the scale and reach of the system's implementation.

The description of the disclosure has been presented for purposes of illustration and description, but is not intended to be exhaustive or limited in the form disclosed. It will be apparent to those of skill in the art that many modifications and variations are possible without departing from the scope and spirit of the disclosure, giving full cognizance to equivalents in all respects.

What is claimed is:

1. A method of providing multi-factor authentication of an authenticatable user, comprising the steps of:
   providing a wearable article having a plurality of unique electronic tags within the same article to an authenticatable user;
   receiving a first authentication factor from the wearable article via an electronic tag reader, wherein the plurality of unique electronic tags each provides access for the user to a different authenticatable action, each of the unique electronic tags being associated with one or more authentication factors, each authentication factor including an item of information used to authenticate the user's identity;
   receiving a second authentication factor from a user;
   processing the first authentication factor and the second authentication factor to generate user authentication information and user configuration information;
   generating a list of authentication options for the user that includes a list of the authenticatable actions associated respectively with the plurality of unique electronic tags, and a configuration action based on the authentication information and user configuration information, wherein the list includes a unique identifier associated with the authenticatable action and a unique identifier associated with the configuration action;
   displaying the list to the user via a graphical user interface for confirmation by the user;
   authenticating the user for access to a computing device with the user authentication information; and
   configuring the computing device for the user with the user configuration information,
   wherein said list of authenticatable actions comprises different authenticatable actions for at least one of i) different access to different physical facilities, or ii) different access to different financial transactions.

2. The method of claim 1, wherein the unique electronic tags each comprises a radio frequency identifier (RFID) tag, and wherein receiving the first authentication factor includes receiving the RFID tag.

3. The method of claim 1, wherein receiving the second authentication factor from the user includes receiving a biometric indicator from the user.

4. The method of claim 1, wherein receiving the second authentication factor from the user includes receiving a personal identification number from the user.

5. The method of claim 1, wherein the method includes cross-referencing the first authentication factor and the second authentication factor with stored authentication information associated with the user.

6. The method of claim 5, wherein the method includes authenticating the user if the first authentication factor and the second authentication factor are determined to match the stored authentication information associated with the user.

7. The method of claim 1, wherein the method includes generating a request that the user provide the second authentication factor upon receipt of the first authentication factor with the electronic tag reader.

8. The method of claim 7, wherein the method includes providing the request that the user provide the second authentication factor through a graphical user interface.

9. A non-transitory computer-readable medium having computer-executable instructions to provide multi-factor authentication of an authenticatable user stored thereon that are executed by a processor to:
   receive a first authentication factor from a wearable article worn by a user via an electronic tag reader, wherein the wearable article includes a plurality of unique electronic tags within the same article, the plurality of unique electronic tags each providing access for the user to a different authenticatable action, each of the unique electronic tags associated with one or more authentication factors, each authentication factor including an item of information used to authenticate the user's identity;
   receive a second authentication factor that includes a biometric feature from the user via a biometric feature reader;
   generate user authentication information from the wearable article and user configuration information from the biometric feature upon processing the first authentication factor and the second authentication factor;
   generate a list of authentication options for the user that includes a list of the authenticatable actions associated respectively with the plurality of unique electronic tags, and a configuration action based on the authentication information and user configuration information, wherein the list includes a unique identifier associated with the authenticatable action and a unique identifier associated with the configuration action;

display the list to the user via a graphical user interface for confirmation by the user;

authenticate the user for access to a computing device with the user authentication information from the wearable article; and configure the computing device for the user with the user configuration information from the biometric feature, wherein said list of authenticatable actions comprises different authenticatable actions for at least one of i) different access to different physical facilities, or ii) different access to different financial transactions.

10. The medium of claim 9, including instructions executed to receive a third authentication factor from a second unique electronic tag in the wearable article.

11. The medium of claim 9, including instructions executed to generate a first user authentication action upon processing the first authentication factor and a second user authentication action upon processing the third authentication factor.

12. The medium of claim 11, wherein the first authentication factor is different from the third authentication factor.

13. A multi-factor authentication system providing multi-factor authentication of an authenticatable user, comprising:
    a wearable article having a plurality of unique electronic tags within the same article provided to an authenticatable user;
    a processor;
    a memory storing computer-readable instructions, the computer-readable instructions executable by the processor to:
    receive a first authentication factor from the wearable article which includes a radio frequency identifier (RFID) tag, wherein the plurality of unique electronic tags provides access for the user to a different authenticatable action, each of the unique electronic tags being each associated with one or more authentication factors, each authentication factor including an item of information used to authenticate the user's identity;
    receive a second authentication factor that includes a biometric feature from a user;
    process the first authentication factor and the second authentication factor to generate user authentication information and user configuration information, wherein the first authentication factor from the RFID tag and the second authentication factor that includes the biometric feature are cross referenced with stored authentication information associated with the user;
    generate a list of authentication options for the user that includes a list of the authenticatable actions associated respectively with the plurality of unique electronic tags, and a configuration action based on the authentication information and user configuration information, wherein the list includes a unique identifier associated with the authenticatable action and a unique identifier associated with the configuration action;
    display the list to the user via a graphical user interface for confirmation by the user;
    authenticate the user for access to a computing device with the user authentication information; and
    configure the computing device for the user with the user configuration information,
    wherein said list of authenticatable actions comprises different authenticatable actions for at least one of i) different access to different physical facilities, or ii) different access to different financial transactions.

14. The system of claim 13, wherein the user is authenticated when the first authentication factor and the second authentication factor are determined to match the stored authentication information associated with the user.

15. The system of claim 13, wherein
    the wearable article includes at least one of a watch, a ring, or jewelry.

16. The system of claim 13, wherein the configuration information includes configuration information for an information processing system of the computing device.

17. The system of claim 13, wherein the RFID tag includes a rewritable memory, wherein the first authentication factor is stored in the rewritable memory.

18. The system of claim 13, wherein the RFID tag includes a read-only memory, wherein the first authentication factor is stored in the read-only memory.

* * * * *